(12) United States Patent
Tilly (10) Patent No.: US 8,428,401 B2
(45) Date of Patent: Apr. 23, 2013

(54) ON-CHIP OPTICAL WAVEGUIDE

(75) Inventor: Lars Tilly, Limhamn (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 431 days.

(21) Appl. No.: 12/639,329

(22) Filed: Dec. 16, 2009

(65) Prior Publication Data

US 2011/0142392 A1  Jun. 16, 2011

(51) Int. Cl.
*G02B 6/12* (2006.01)
*G02B 6/10* (2006.01)

(52) U.S. Cl.
USPC .............................................. 385/14; 385/39

(58) Field of Classification Search ..................... 385/14, 385/39
See application file for complete search history.

(56) References Cited

U.S. PATENT DOCUMENTS

| | | | |
|---|---|---|---|
| 6,197,678 B1 | 3/2001 | Yu | |
| 6,522,304 B2 * | 2/2003 | Ballantine et al. | 343/772 |
| 7,056,823 B2 | 6/2006 | Cho | |
| 7,203,387 B2 * | 4/2007 | Doan | 385/14 |
| 7,349,614 B2 * | 3/2008 | Doan | 385/131 |
| 7,389,025 B2 * | 6/2008 | Smith et al. | 385/39 |
| 7,711,230 B2 * | 5/2010 | Khan | 385/129 |
| 8,092,704 B2 * | 1/2012 | Balamane et al. | 216/57 |
| 2002/0149530 A1 | 10/2002 | Ballantine et al. | 343/772 |
| 2003/0081902 A1 * | 5/2003 | Blauvelt et al. | 385/50 |
| 2004/0012978 A1 | 1/2004 | Doi | |
| 2005/0053319 A1 * | 3/2005 | Doan | 385/14 |
| 2007/0077018 A1 * | 4/2007 | Doan | 385/131 |
| 2007/0230870 A1 * | 10/2007 | Smith et al. | 385/32 |
| 2008/0008418 A1 * | 1/2008 | Smith et al. | 385/32 |
| 2008/0107377 A1 | 5/2008 | Cho et al. | |
| 2011/0142392 A1 * | 6/2011 | Tilly | 385/14 |

FOREIGN PATENT DOCUMENTS

EP  2083296 A2  7/2009

OTHER PUBLICATIONS

Ponoth, S., et al., Fabrication of Micromirrors with Self-aligned metallization using Silicon Back-end-of-the-line Processes. "Elsevier B.V. Thin Solid Films 472 (2005) 169-179". Science Direct.

I.P. Kaminow, et al.; "Metal-Clad Optical Waveguides: Analytical and Experimental Study"; XP-002492897; Applied Optics, vol. 13, No. 2; Feb. 1974; pp. 395-405; Holmdel, NJ.

International Search Report mailed Mar. 31, 2011 in corresponding International PCT Application No. PCT/EP2010/069377.

Written Opinion of the International Searching Authority mailed Mar. 31, 2011 in corresponding International PCT Application No. PCT/EP2010/069377.

The International Preliminary Report on Patentability in corresponding International Application No. PCT/2010/069377 mailed Mar. 30, 2012. (The references cited were already made of record in previously filed information Disclosure Statements).

* cited by examiner

*Primary Examiner* — K. Cyrus Kianni (74) *Attorney, Agent, or Firm* — Potomac Patent Group PLLC (57) ABSTRACT

Systems and methods according to these exemplary embodiments provide for on-chip optical waveguides, methods of making on-chip optical waveguides, and devices including such on-chip optical waveguides. A dielectric layer formed from, e.g., transparent spacer dielectric material, forms a waveguide core and can be surrounded or substantially surrounded by a metal cladding layer. The metal cladding layer can be formed in the chip using backend metallization techniques, e.g., Damascene processing.

9 Claims, 6 Drawing Sheets

ON-CHIP OPTICAL WAVEGUIDE

TECHNICAL FIELD

The present invention relates generally to integrated circuits and, more specifically, to the provision of optical waveguides in integrated circuits.

BACKGROUND

In today's society, electrical and electronic devices are plentiful. For example, televisions, personal computers and cellular phones can be found as common household items in many people's homes. Many, or perhaps most, of these devices include application specific integrated circuits (ASICs). ASICs provide customized functionality for different devices. However, the functionalities of these ASICs have becoming increasingly complex, requiring million and even billions of transistors to be integrated to form a complete ASIC chip.

ASICs are most commonly realized in the topmost part of single crystalline silicon wafers. Signal routing for connecting different parts of an ASIC circuit on such silicon wafers (both for digital and analog circuitry) is currently accomplished by using electrical wiring, e.g., patterned onto the silicon wafer. For example, multiple metal layers deposited on top of the ASIC structure can be patterned to form individual connections between transistors and functional blocks as desired.

In such ASICs, integrated circuits or other "on-chip" devices, the capacitance associated with each signal wire loads the feeding circuits with an impedance load that increases as a function of clock frequency. Thus, the dynamic dissipated power of the signal line also becomes higher with frequency according to the function:

$$P_{diss} = C_L V^2_{DD} f \quad (1)$$

where:
$P_{diss}$=dissipated power,
$C_L$=capacitance of the signal line connected to the feeding circuit,
$V_{DD}$=supply voltage, and
f=clock frequency.

The packing density in such devices increases as the width of the metallized traces or signal lines goes down, resulting in higher and higher dynamic power dissipation per unit of chip area, thereby limiting the usable clock frequency. This is the reason why the steady and periodic increase in the clock frequency for digital circuitry has now come to a halt for digital processors.

One solution that has been discussed to overcome this problem is to replace, as much as possible, electrical signals with optical signals on-chip. However this raises the issue of how to convey optical signals on, e.g., a silicon chip. Traditionally, optical signals are conveyed in, for example, optical fibers between optical transmitters and optical receivers. However, classical optical fiber arrangements using e.g., drawn silica fibers, are not compatible with the semiconductor manufacturing processes used to fabricate ASICs, other integrated circuits and the like.

Accordingly, systems, methods and devices for providing an on-chip optical waveguide would be desirable.

SUMMARY

Systems and methods according to these exemplary embodiments provide for on-chip optical waveguides, methods of making on-chip optical waveguides, and devices including such on-chip optical waveguides. A dielectric layer formed from, e.g., transparent spacer dielectric material, forms a waveguide core and can be surrounded or substantially surrounded by a metal cladding layer. The metal cladding layer can be formed in the chip using backend metallization techniques, e.g., Damascene processing. Advantages according to exemplary embodiments described herein include, for example, reduced use of electrical signaling in integrated circuits, resulting in lower power dissipation and less heat being generated. However, it will be appreciated by those skilled in the art that such advantages are not to be construed as limitations of the present invention except to the extent that they are explicitly recited in one or more of the appended claims.

According to an exemplary embodiment, an on-chip optical waveguide includes a substrate, a dielectric layer disposed on top of the substrate, wherein the dielectric layer is patterned to form a core of the on-chip optical waveguide, side walls of the optical waveguide which are disposed adjacent to the core and which are made of metal, and a first metallization layer disposed on the dielectric layer and on the side walls, wherein the side walls and the first metallization layer form part of a cladding layer of the on-chip optical waveguide around the core.

According to another exemplary embodiment, a method for fabricating an on-chip optical waveguide includes the steps of providing a substrate, forming a dielectric layer on top of the substrate, forming a first metallization layer on both sides of the dielectric layer using a Damascene metallization process, and forming a second metallization layer on top of the dielectric layer, wherein the dielectric layer forms a core of the on-chip optical waveguide and the first and second metallization layers form a part of a cladding layer of the on-chip optical waveguide.

According to another exemplary embodiment, a method for conveying optical signals in an optical waveguide formed on a semiconductor chip includes conveying the optical signals in a core of the optical waveguide, which core is formed from a dielectric layer of the semiconductor chip, and internally reflecting the optical signals as they are conveyed within the optical waveguide by a cladding layer of the optical waveguide, which cladding layer is formed from a plurality of metallization layers which substantially surround the dielectric layer on the semiconductor chip.

BRIEF DESCRIPTION OF THE DRAWINGS

The accompanying drawings illustrate exemplary embodiments, wherein.

DETAILED DESCRIPTION

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Figure 1A:
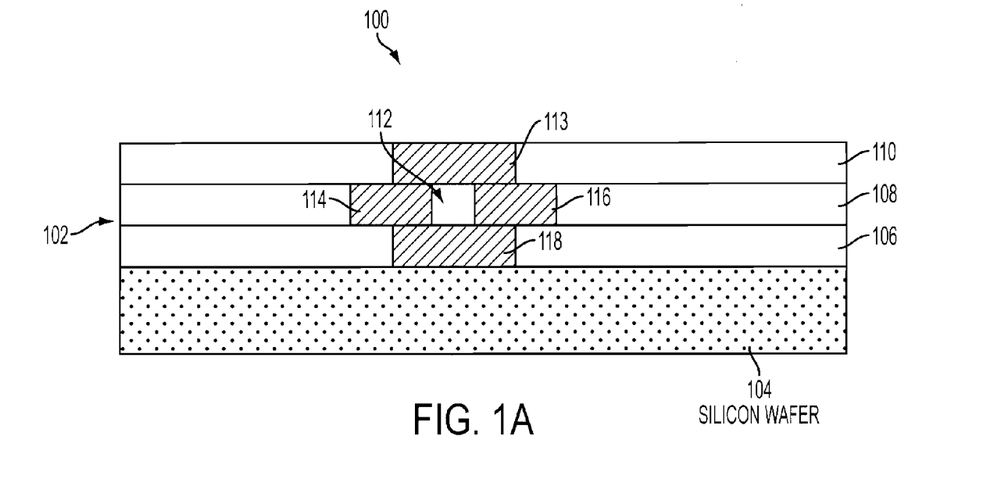
FIG. 1(a) depicts a cross-sectional view through the waveguide structure perpendicular to the primary light path of an on-chip optical waveguide according to an exemplary embodiment.
Figure 1B:
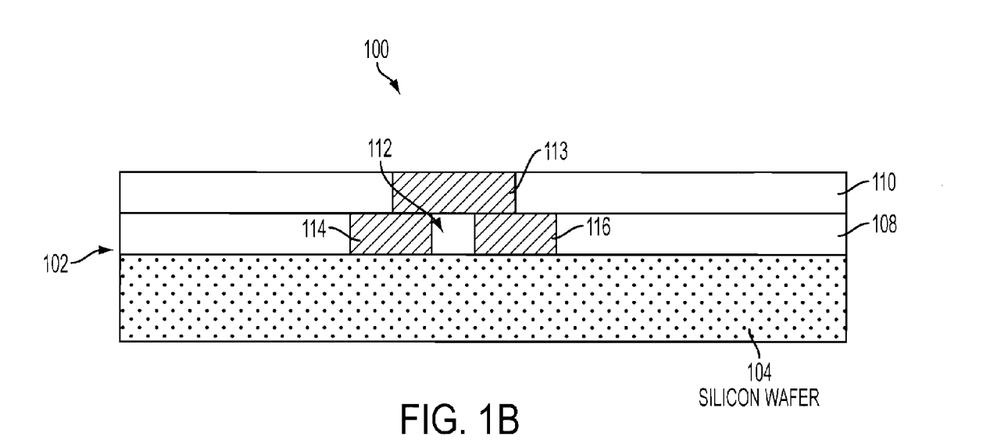
FIG. 1(b) depicts a cross-sectional view through the waveguide structure perpendicular to the primary light path of an on-chip optical waveguide according to another exemplary embodiment.

As described in the background, it would be desirable to provide ASICs, integrated circuit chips and like devices with optical waveguides so that at least some signals can be conveyed optically rather than electrically. According to exemplary embodiments, this can be accomplished by fabricating such devices with a dielectric waveguide core and a cladding layer which, at least in part, is made from metal which can be provided on the chip using standard, backend metallization processes. This combination may then be used to transport optical signals on-chip. Such embodiments will be better understood upon reading the following description beginning with a discussion of FIG. 1.

Therein, a cross-section of an on-chip optical waveguide 100 provided on an integrated circuit (IC) chip 102 according to an exemplary embodiment is illustrated. The IC chip 102 has a multilayered structure including a substrate 104, which may for example be a silicon wafer, and three layers 106, 108 and 110 which are disposed on top of the substrate 104. Those skilled in the art will appreciate that IC chips will typically have more than four layers associated therewith, however four are illustrated to simplify the discussion. The core 112 of the optical waveguide 100 may, for example be fabricated from a transparent dielectric material, e.g., the same dielectric material used to form spacers in such IC chips. According to these exemplary embodiments, however, the dielectric core 112 is deposited (or otherwise provided) onto the substrate 104 (or an intervening layer) and patterned to conform to the desired optical signal path between the signal generator and signal receiver, as will be more apparent from the discussion of subsequent Figures. The dielectric core 112 can be made from any desired dielectric material which is conducive to the transmission of optical signals, e.g., silicon dioxide or silicon nitride.

Also shown in FIG. 1(a) are various metal layers (or portions of metal layers) 113, 114, 116 and 118 which form, according to this exemplary embodiment, a cladding layer associated with the waveguide 100. The cladding layer operates to keep the light associated with optical signals within the optical waveguide 100 by reflecting the light internally, as will be further described below. Thus the metal cladding 113, 114, 116, and 118 will have a lower refractive index than the dielectric core 112 such that total internal reflection of the light traveling through the waveguide 100 occurs at the boundary between the dielectric core 112 and the metal cladding 113, 114, 116 and 118. The metal layers 113, 114, 116 and 118 can be made from any desired metal having the desired refractive properties and which is suitable to deposition using backend metallization processes, and may also overlap one another as shown in FIG. 1(a) to prevent light from escaping from the waveguide 100.

For example, so-called "Damascene" processes can be used to deposit the metal cladding around the dielectric core 112. Briefly, and purely for illustrative example, a Damascene processes for generating the portion of waveguide 100 associated with layer 108 of the IC chip 102 can involve depositing a layer of dielectric material onto layer 106, masking off the regions 114 and 116, etching away the dielectric material in regions 114 and 116 to form trenches, and then depositing metal into the trenches to create the "sidewalls" of the cladding layer. Any desired metal can be used, e.g., aluminum, to form these sidewalls, as well as the top metal layer 113 and the bottom metal layer 118 which together complete the cladding layer. For more information regarding backend metallization processes and Damascene processes, the interested reader is referred to U.S. Pat. Nos. 7,056,823 and 6,197,678, the disclosures of which are incorporated here by reference.

Note, however, that it is not necessary in all cases for the cladding layer to be completely formed of metallizations as shown in FIG. 1(a). Alternatively, for example, an on-chip optical waveguide according to another exemplary embodiment could employ the substrate 104 as part of the cladding layer as shown in FIG. 1(b), e.g., for portions of the optical waveguide wherein the waveguide extends to the surface of the substrate such as for inclusion of optical transmitting and/or receiving devices as will be described in more detail below. Therein, layer 106 from FIG. 1(a) has been omitted and the portion of the substrate 104 which bounds the dielectric core 112 serves to complete the cladding layer which also includes the metallization layers 113, 114 and 116.

From the foregoing, it will be appreciated that an on-chip optical waveguide according to exemplary embodiments may thus include a substrate, a dielectric layer disposed on top of the substrate, wherein the dielectric layer is patterned to form a core of the on-chip optical waveguide, side walls of the optical waveguide which are disposed adjacent to the core and which are made of metal, and a first metallization layer disposed on the dielectric layer and on the side walls, wherein the side walls and the first metallization layer form part of a cladding layer of the on-chip optical waveguide around the core. This signal pathway nature of these exemplary embodiments will be better understood upon review of the top view of an exemplary embodiment illustrated in FIG. 2. Therein, it can be seen how an optical signal 200 traveling through the dielectric core 112 is internally reflected as it hits the refractive index boundaries established by the metal cladding layers 114 and 116 of the on-chip optical waveguide 100.

Figure 2:
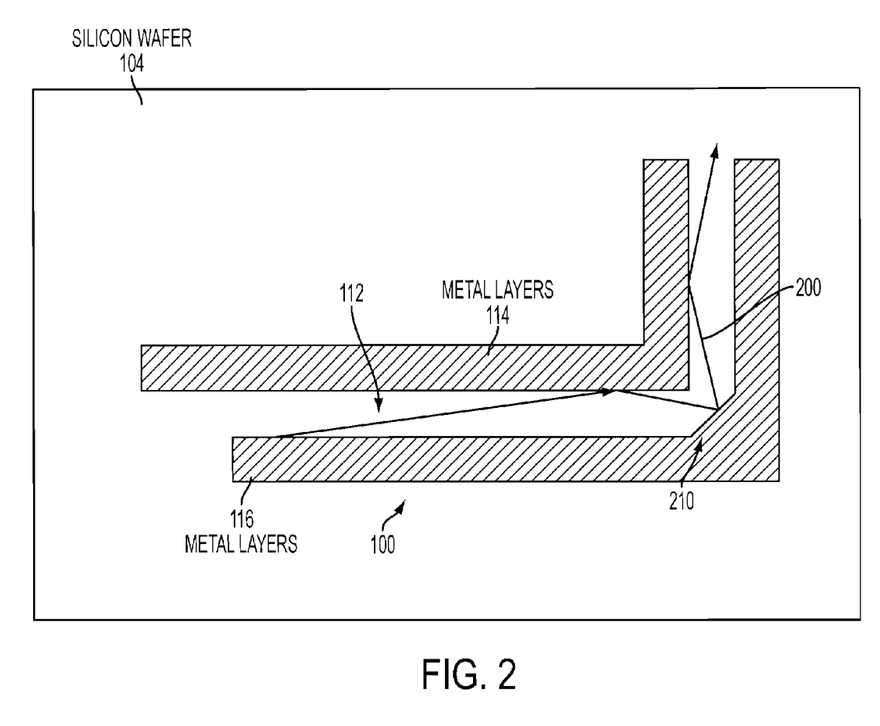
FIG. 2 shows a top view of an on-chip optical waveguide according to an exemplary embodiment including a re-directing structure.

Unlike optical fibers, which are generally flexible in nature and can be easily bent, optical waveguides 100 according to these exemplary embodiments will also generally include reflectors, e.g., reflector 210, in order to route the optical signals along "bends" in the signal pathway. Such reflectors can, for example, be fabricated as mirrors such as those described in the article entitled "Fabrication of micromirrors with self-aligned metallization using silicon back-end-of-the-line processes", to Ponoth et al., published by Elsevier B.V., Thin Solid Films 472 (2005) pp. 169-179, the disclosure of which is incorporated here by reference or in other ways to provide reflectors in various positions along the optical waveguides according to these exemplary embodiments as will now be further described with reference to FIGS. 3 and 4.

Figure 3:
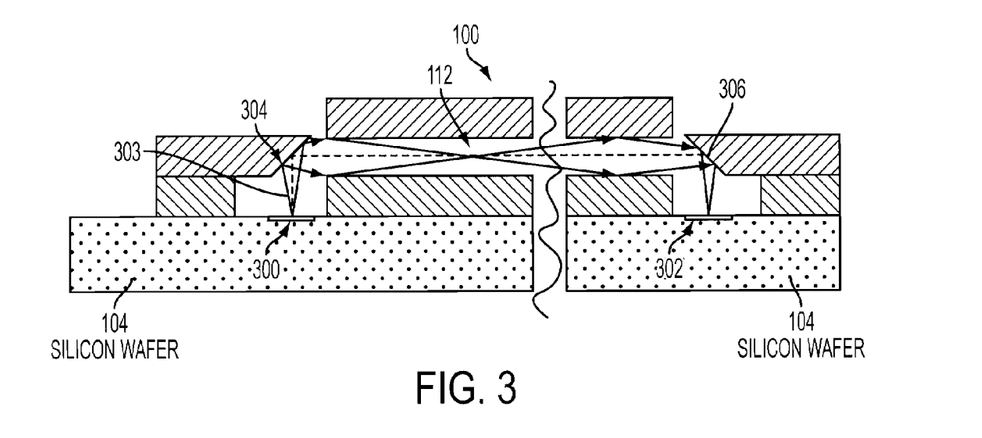
FIG. 3 illustrates a cross section of an arrangement for utilizing backend metallization layers to generate an on-chip optical waveguide structure according to exemplary embodiments.

Starting with FIG. 3, it can be seen that this exemplary embodiment includes an optical transmitting device 300 and an optical receiving device 302 which are integrated into the substrate 104. The optical transmitting device 300 may be fabricated as a planar light generating device which is integrated into the surface of the substrate 104, or the silicon itself may be doped with, e.g., erbium, to create a transmitting device 300, such that it generates an optical light signal 303 that is initially transmitted in a direction which is perpendicular to, or generally perpendicular to, the substrate 104. According to one, purely illustrative embodiment, the transmitting device 300 may generate light in the energy regime close to the band gap of silicon (i.e., hv=1.12 eV) and may, for example, amplitude modulate the light based on an electrical signal which conveys a stream of data.

The optical light signal 303 can then be redirected by reflector 304 to follow the signal path defined by the optical waveguide 100, which is shown in the cross-sectional view of FIG. 3 as including the lighter areas (dielectric core 112) bounded by darker regions (metal cladding) as previously described with respect to FIGS. 1 and 2. The reflector 304 can be formed with, for example, a reflector surface having approximately a 45 degree angle relative to the transmitted optical signal 303. This reflector surface can, for example, be created by etching the dielectric material which forms the core of the waveguide 100 with an anisotropic etching process prior to metal deposition of the various metal layers shown in FIG. 3, or by a reactive ion etch process with a directional etching rate working at 45 degree incidence prior to metal deposition. The reflector 304 redirects the optical signal 303 such that it is subsequently traveling in a direction which is parallel with, or generally parallel with, the substrate 104.

In the exemplary embodiment of FIG. 3, the optical signal 303 travels through the waveguide 100 until it reaches a second reflector 306. As seen in the Figure, the light may propagate along many different paths through the waveguide 100, but is contained by the metal cladding layer. Reflector 306 redirects the optical signal 303 so that it then travels downwardly toward the optical receiving device 302. Optical receiving device 302 may be formed, for example, as a P-N junction in the substrate 104 operating as a photodetector which transforms the received optical signal back into an electrical signal for further processing or off-chip routing.

Figure 4:
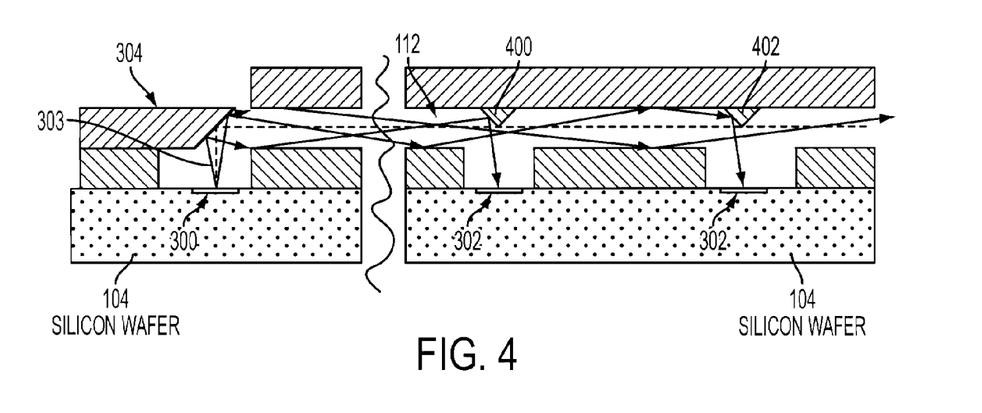
FIG. 4 depicts another cross-sectional view of an exemplary embodiment for multiplexing an optical signal to a plurality of detectors and circuit blocks using a reflective arrangement.

The embodiment of FIG. 4 further extends the afore-described concepts and implementations by providing a plurality of reflectors 400 and 402 along the optical waveguide 100 each of which redirect a portion of the optical signal 303 downwardly towards respective optical receiving devices 302. Of particular interest in this example is the design of the reflectors 400 and 402 as being sized to be smaller than a cross-sectional area of the core 112. In this way, some of the light associated with optical signal 303 is redirected downwardly toward each of the optical receiving devices 302, but some of the light passes by each of the reflectors 400 and 402 to continue down the optical waveguide 100, e.g., to reach other optical receiving devices 302 (not shown in FIG. 4). This exemplary structure enables on-chip optical waveguides to provide an optical bus signal which is multiplexed to different parts (consumers of bus data) on the IC chip. Moreover, optical wavelength multiplexing could also be used to increase the multiplexing capability of this structure.

From the foregoing, it will be appreciated that since no impedance load results from signal carrying techniques according to these exemplary embodiments, that no power dissipation is created by these optical waveguide structures, or at least the optical portions thereof for IC chips which employ both the afore-described optical waveguides and conventional electrical traces. The speed of the signal transmission is only limited by the speed of the light emitters and detectors, which are in the high GHz range, several orders of magnitude higher than their electrical counterparts which are limited by today's clock frequency. Moreover, while the losses experienced in optical fibers is considered critical in long range optical fiber communication systems, e.g., discussed in terms of dB/km, such losses are less important in on-chip optical waveguides due to the relatively short distances over which such signals will travel by comparison. Thus even though per-unit distance losses will be higher, e.g., due to using metal cladding as opposed to the more specially designed cladding materials used in optical fibers, such losses are tolerable in these exemplary embodiments and offset by the capability of being able to use existing semiconductor manufacturing techniques to form both the optical core and the cladding layer of these optical waveguides.

Figure 5:
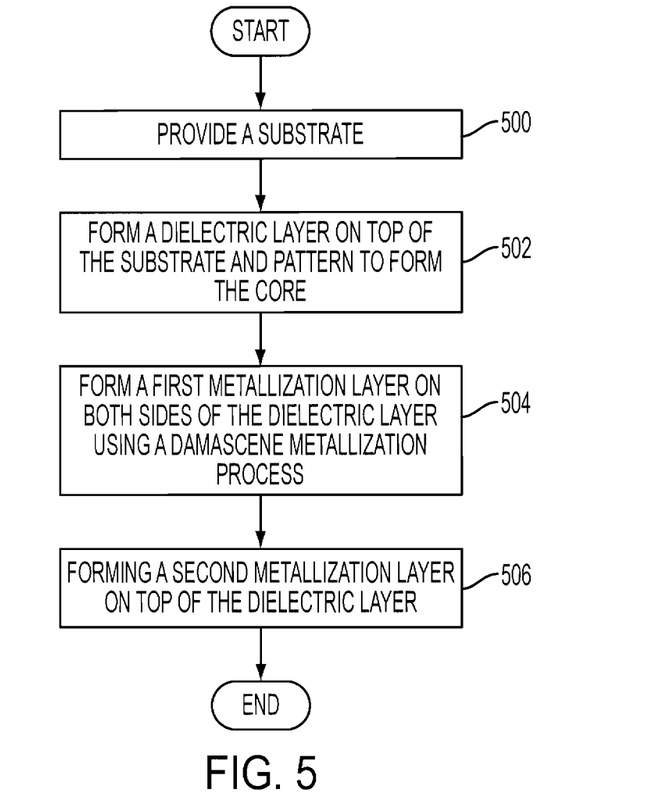
FIG. 5 is a flowchart illustrating a method for forming an on-chip optical waveguide according to an exemplary embodiment.

Thus, according to one exemplary embodiment, a method for fabricating an on-chip optical waveguide can include the steps illustrated in the flowchart of FIG. 5. Therein, at step 500, a substrate is provided. A dielectric layer is formed on top of the substrate, at step 502. As described above, this dielectric layer may be formed, at least in part, directly on the substrate and/or, at least in part, on an intervening metal layer, and patterned to form the core of the on-chip optical waveguide as desired. A first metallization layer is formed on both sides of the dielectric layer using a Damascene metallization process as shown in step 504. A second metallization layer is formed at step 506 on top of the dielectric layer, such that the dielectric layer forms a core of the on-chip optical waveguide and the first and second metallization layers form a part of a cladding layer of the on-chip optical waveguide.

Figure 6:
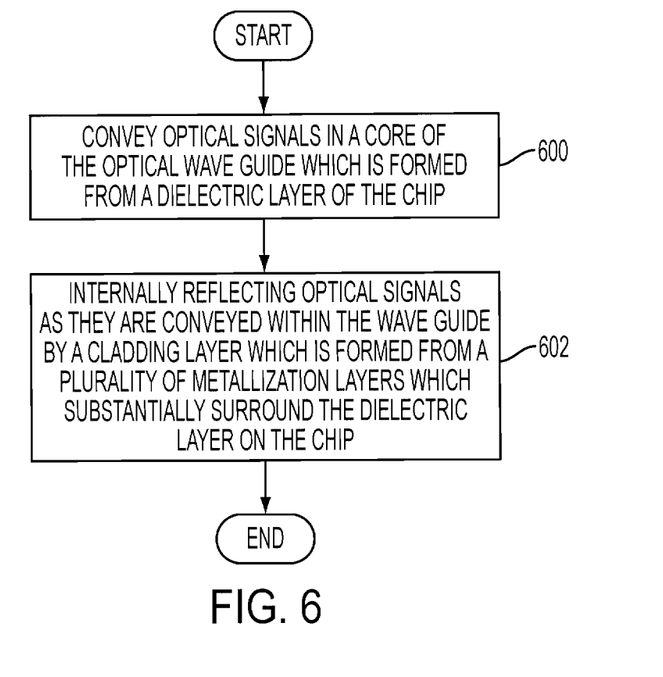
FIG. 6 is a flowchart depicting a method for conveying an optical signal using an on-chip optical waveguide according to exemplary embodiments.

According to another exemplary embodiment, a method for conveying optical signals in an optical waveguide formed on a semiconductor chip can include the steps illustrated in the flowchart of FIG. 6. Therein, at step 600, optical signals are conveyed in a core of the optical waveguide, which core is formed from a dielectric layer of the semiconductor chip. At step 602, the optical signals are internally reflecting signals as they are conveyed within the optical waveguide by a cladding layer of the optical waveguide, which cladding layer is formed from a plurality of metallization layers which substantially surround the dielectric layer on the semiconductor chip, e.g., except for areas on the semiconductor substrate which include optical transmitting and/or optical receiving devices.

Figure 7:
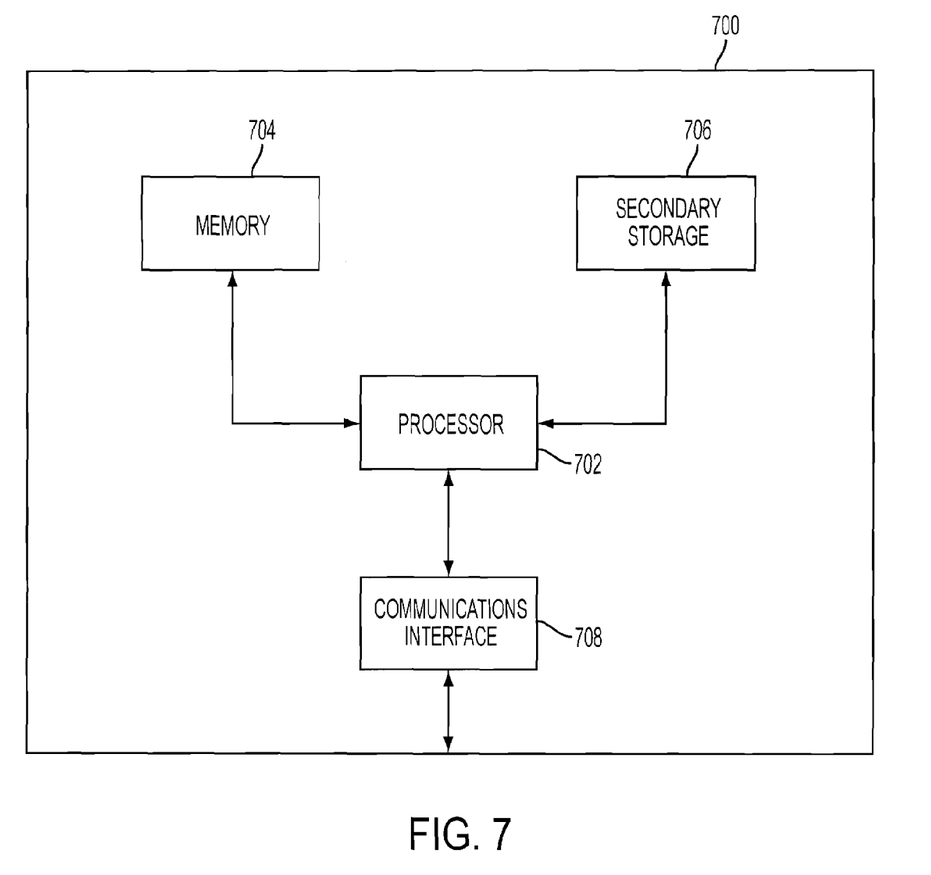
FIG. 7 shows an electronic device which can include an on-chip optical waveguide according to exemplary embodiments.

On-chip optical waveguides according to these exemplary embodiments will have many applications in various electronic devices including, for example, portable electronic apparatuses, a mobile telephone, a computer, a portable media player, a satellite navigation device, a pager, a communicator, an electronic organizer, a smart phone, or a personal digital assistant (PDA). Various of these electronic devices can be represented generically as shown in FIG. 7. Therein, an electronic device 700 can, for example, contain a processor 702 (or multiple processor cores), memory 704, one or more secondary storage devices 706 and one or more communications interfaces 708. The processor 702 and/or the communications interface can, for example, be implemented as integrated circuit chips which have at least some on-chip optical waveguides as described above in conjunction with the exemplary embodiments shown in FIGS. 1-6. According to some exemplary embodiments, such integrated circuit chips can, for example, use such on-chip optical waveguides to carry signals on the lengthier signal paths on a chip, and use electrical signal traces to carry signals on the shorter signal paths on the chip.

The above-described exemplary embodiments are intended to be illustrative in all respects, rather than restrictive, of the present invention. Thus the present invention is capable of many variations in detailed implementation that can be derived from the description contained herein by a person skilled in the art. For example, although the metal layers are described above as forming the cladding layer and internally reflecting the light within the dielectric core of the waveguide, other layers may perform at least some of the reflecting function of the cladding layer. For example, when the aforedescribed Damascene process is used to provide the metal layers, e.g., using copper, a barrier layer may be provided along with the metal layer as described, for example, in the above-incorporated by reference U.S. Pat. No. 6,197,678. Such a barrier layer may perform at least some of the reflecting function of the cladding layer when present. Accordingly, as used herein and in the claims, the phrases "metal layer", "metallization layer" and variants thereof refer to both metal layers by themselves and/or metal layers with associated barrier layers. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

The invention claimed is:

1. An on-chip optical waveguide comprising:
   a substrate;
   a dielectric layer disposed on top of the substrate, wherein said dielectric layer is patterned to form a core of said on-chip optical waveguide;
   side walls of said optical waveguide which are disposed adjacent to said core and which are made of metal;
   a first metallization layer disposed on said dielectric layer and on the side walls;
   a second metallization layer disposed on a lower surface of said dielectric layer and on a first lower surface portion of the side walls, wherein said side walls, said first metallization layer and said second metallization layer form a cladding layer of said on-chip optical waveguide around said core;
   an optical transmitter device formed in said substrate and configured to transmit light into said dielectric layer via a reflector arrangement; and
   an optical receiver device formed in said substrate and configured to receive said light from said optical waveguide formed from said dielectric layer via said reflector arrangement.

2. The on-chip optical waveguide of claim 1, wherein said dielectric layer is formed directly on top of the substrate, such that said substrate completes said cladding layer in conjunction with said side walls and said first metallization layer.

3. The on-chip optical waveguide of claim 1, wherein said dielectric layer is formed on a second metallization layer disposed between said substrate and said dielectric layer, such that said second metallization layer completes said cladding layer in conjunction with said side walls and said first metallization layer.

4. The on-chip optical waveguide of claim 3, wherein said first metallization layer and said side walls are in direct contact with said dielectric layer.

5. The on-chip optical waveguide of claim 1, wherein said side walls are formed by filling trenches with said metal using a Damascene metal deposition and planarization process.

6. The on-chip optical waveguide of claim 1, further comprising:
   a reflector which extends from said first metallization layer into said core formed from said dielectric layer.

7. The on-chip optical waveguide of claim 6, wherein said reflector is sized to be smaller than a cross-sectional area of said core.

8. The on-chip optical waveguide of claim 6, further comprising:
   an optical receiver device formed in said substrate below said reflector.

9. The on-chip optical waveguide of claim 1, wherein said optical transmitter transmits said light in a first direction which is generally perpendicular to said substrate and further comprising:
   a reflector in said reflector arrangement which is formed in a third metallization layer which reflector is configured to redirect said light traveling through said core formed from said dielectric layer in a second direction which is generally parallel to said substrate.

* * * * *